United States Patent
Döbbeling et al.

(10) Patent No.: US 6,256,975 B1
(45) Date of Patent: Jul. 10, 2001

(54) METHOD FOR RELIABLY REMOVING LIQUID FUEL FROM THE FUEL SYSTEM OF A GAS TURBINE, AND A DEVICE FOR CARRYING OUT THE METHOD

(75) Inventors: Klaus Döbbeling, Windisch; Geoffrey Engelbrecht, Ennetbaden; Fulvio Magni, Nussbaumen, all of (CH); Gerhard Müller, Germering (DE)

(73) Assignee: ABB Research Ltd., Zurich (CH)

( * ) Notice: Subject to any disclaimer, the term of this patent is extended or adjusted under 35 U.S.C. 154(b) by 0 days.

(21) Appl. No.: 09/255,710

(22) Filed: Feb. 23, 1999

(30) Foreign Application Priority Data

Feb. 26, 1998 (EP) .................................................. 98810157

(51) Int. Cl.⁷ ...................................................... F02G 3/00
(52) U.S. Cl. ...................................... 60/39.02; 60/39.094
(58) Field of Search ............................ 60/39.02, 39.094, 60/39.06, 39.05, 39.55

(56) References Cited

U.S. PATENT DOCUMENTS

| 2,015,995 | 10/1935 | Egtvedt . |
| 2,038,998 | 4/1936 | Hammond, Jr. . |
| 3,901,025 | 8/1975 | Bryerton et al. . |
| 4,032,091 | 6/1977 | Reddy . |
| 4,095,418 | * 6/1978 | Mansson et al. ................. 60/39.094 |
| 4,391,241 | 7/1983 | Dohshita et al. . |
| 5,443,085 | * 8/1995 | Huddas ............................... 134/95.1 |
| 5,809,771 | * 9/1998 | Wernberg .......................... 60/39.094 |
| 6,125,624 | * 10/2000 | Prociw .............................. 60/39.094 |

FOREIGN PATENT DOCUMENTS

| 0724115A2 | 7/1996 | (EP) . |
| 60-017626 | 1/1985 | (JP) . |

* cited by examiner

Primary Examiner—Charles G. Freay
Assistant Examiner—David J. Torrente
(74) Attorney, Agent, or Firm—Burns, Doane, Swecker & Mathis, L.L.P.

(57) ABSTRACT

In a method for reliably removing liquid fuel from the fuel system of a gas turbine after shutting down the same, in the case of which fuel system liquid fuel is fed via at least a first feeder line in normal operation of the gas turbine to a burner and injected there into a combustion chamber via fuel nozzles, a high reliability against explosion and coking is achieved in a simple way by virtue of the fact that the liquid fuel is flushed from the fuel system by the use of an inert auxiliary medium.

15 Claims, 2 Drawing Sheets

METHOD FOR RELIABLY REMOVING LIQUID FUEL FROM THE FUEL SYSTEM OF A GAS TURBINE, AND A DEVICE FOR CARRYING OUT THE METHOD

FIELD OF THE INVENTION

The present invention relates to the field of gas turbine engineering. It relates to method and apparatus for removing liquid fuel from the fuel system of a gas turbine after shutting down the turbine

BACKGROUND OF THE INVENTION

Gas turbines are increasingly being equipped with multiple burner systems. The liquid fuels are injected in this case into the burner systems by using complex atomizer nozzles. Within the scope of the attempts to optimize the combustion quality with respect to the emissions and the efficiency, it is necessary for these parameters to satisfy ever more stringent quality requirements with reference to the spray quality in the case of modern gas turbine atomizers. Stationary gas turbines are operated with a wide range of liquid fuel qualities. These fuels, for example heating oil of "extra light" quality, tend to form residues when vaporized (coking).

If a gas turbine operated with liquid fuel is shut down, the fuel injection systems heat up via the convective thermal flux of the surrounding material to such an extent that such residues can form if the fuel systems situated in the region of the thermal block have not been completely emptied of fuel. These hard residues worsen the atomizer quality to an inadmissible extent, and lead to rising through-flow resistances of the nozzles. The gas turbine can no longer be operated in the advanced stage of formation of residues.

Over and above the problem of coking, after the shutdown of a gas turbine operated with liquid fuel there is also the risk of the fuel passing from the fuel systems in an uncontrolled fashion into the combustion chamber when the rotor is stationary, or into the boiler possibly connected downstream of the gas turbine and forming an explosive mixture there with air at rest.

In order to avoid the problems described, the liquid fuel must be removed from the fuel systems in a controlled process after shutting down the gas turbine.

SUMMARY OF THE INVENTION

Accordingly, one object of the invention is to provide a novel method and a novel device by means of which the remaining liquid fuel can be reliably removed from the fuel systems of a shut-down gas turbine, and thus coking in the burners and the formation of explosive air/fuel mixtures in the exhaust gas section of the gas turbine can be avoided.

The object is achieved in the case of a method of the type mentioned at the beginning by virtue of the fact that the liquid fuel is flushed from the fuel system by the use of an inert auxiliary medium. The flushing out according to the invention makes it possible to remove the remaining liquid fuel in a way which is simple and can be controlled effectively. In particular, the use of an auxiliary medium provides the possibility of removing even small residues of the fuel, such as surface films, for example, rapidly and reliably from the fuel systems.

A first preferred embodiment of the method according to the invention is distinguished in that with the shutdown of the gas turbine the feed of liquid fuel via the first feeder line is interrupted at an interrupt point in the first feeder line, and in that the auxiliary medium is fed into the first feeder line via a second feeder line at a feed-in point located between the interrupt point and the burner. By virtue of feeding in at a special feed-in point on the feeder line, it is possible to start flushing very near the burner. Consequently, that liquid fuel component which must be flushed out via the burner and can lead to explosive mixtures in the exhaust gas section can be kept small.

A preferred development of this embodiment is defined in that the liquid fuel located in the fuel system between the feed-in point and fuel nozzles is flushed into the combustion chamber via the fuel nozzles in a first step by means of the auxiliary medium fed in at the feed-in point, and in that liquid fuel which is located in the first feeder line in front of the feed-in point in the direction of flow is flushed from the first feeder line via a separate outlet in a second step by means of the auxiliary medium fed in at the feed-in point. It is possible by means of the first step completely to remove the liquid fuel, which tends to cause coking, in the region of the burner in a simple way and without further structural measures on the burner/fuel system. The second step prevents liquid fuel subsequently running from the sections of the feeder line which are situated further upstream into lances or nozzles of the burner which have already been cleaned.

The first step, that is to say flushing out the fuel into the combustion chamber is preferably subdivided into two flushing operations, so that the largest portion of the liquid fuel is emptied into the combustion chamber in a first low-pressure flushing operation, the auxiliary medium displacing the liquid fuel from the relevant lines and only residual amounts of the liquid fuel remaining, in particular in the form of surface films, that the remaining residual amounts of the liquid fuel are removed in a second high-pressure flushing operation, and that a defined flow rate of the auxiliary medium is used in each case for the low-pressure flushing operation and the high-pressure flushing operation, the flow rate being greater for the high-pressure flushing operation than for the low-pressure flushing operation.

With the low-pressure flushing operation, the main portion of the fuel is emptied slowly and under controlled conditions. The duration of the low-pressure flushing operation is to be selected in this case such that the bulk of the fuel is removed from the fuel nozzles with a very low impulse. Because of the small shear forces associated with the low flow rate, only small residual amounts of fuel can remain behind in the dead water spaces of the lance or as a film on the material surfaces. The burner lances are completely cleaned with the high-pressure flushing operation. For this purpose, the working pressure, and thus the flow rate of the auxiliary or flushing medium is raised until the fuel or oil film is completely removed from the nozzle surfaces and all dead water regions are completely freed from fuel, and thus all risks of coking are eliminated.

Since in the case of the low-pressure flushing operation the main amount of the liquid fuel is emptied into the combustion chamber and has to be rendered harmless with regard to the risk of an explosion, in accordance with a preferred development of the embodiment of the invention air is sent through the combustion chamber during the low-pressure flushing operation, and the ratio of fuel to air in the combustion chamber is held below the extinction limit or the lean ignition limit. An explosion can thereby be reliably avoided. In this case, to feed the air into the combustion chamber either use is made of the coastdown phase of the gas turbine, or the gas turbine is operated with a switched-on start-up device, preferably with a defined ventilating speed.

The device according to the invention for carrying out the method, which comprises a fuel system for a gas turbine having at least one first feeder line via which the liquid fuel is directed to the burner of the gas turbine and is injected into the combustion chamber, is defined in that a second feeder line, which can be connected to the first feeder line at a feed-in point, is provided.

A first preferred embodiment of the device according to the invention is defined in that the second feeder line is the feeder line of a water injection system by means of which water can be injected into the combustion chamber, in that the second feeder line is connected via a connecting line to the feed-in point on the first feeder line, and in that means for shutting down the connecting line are arranged in the connecting line, and in that the shutdown means comprise a check valve. The existing supply system for the burner can thereby be used in a very simple way for flushing purposes.

Further embodiments follow from the dependent claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
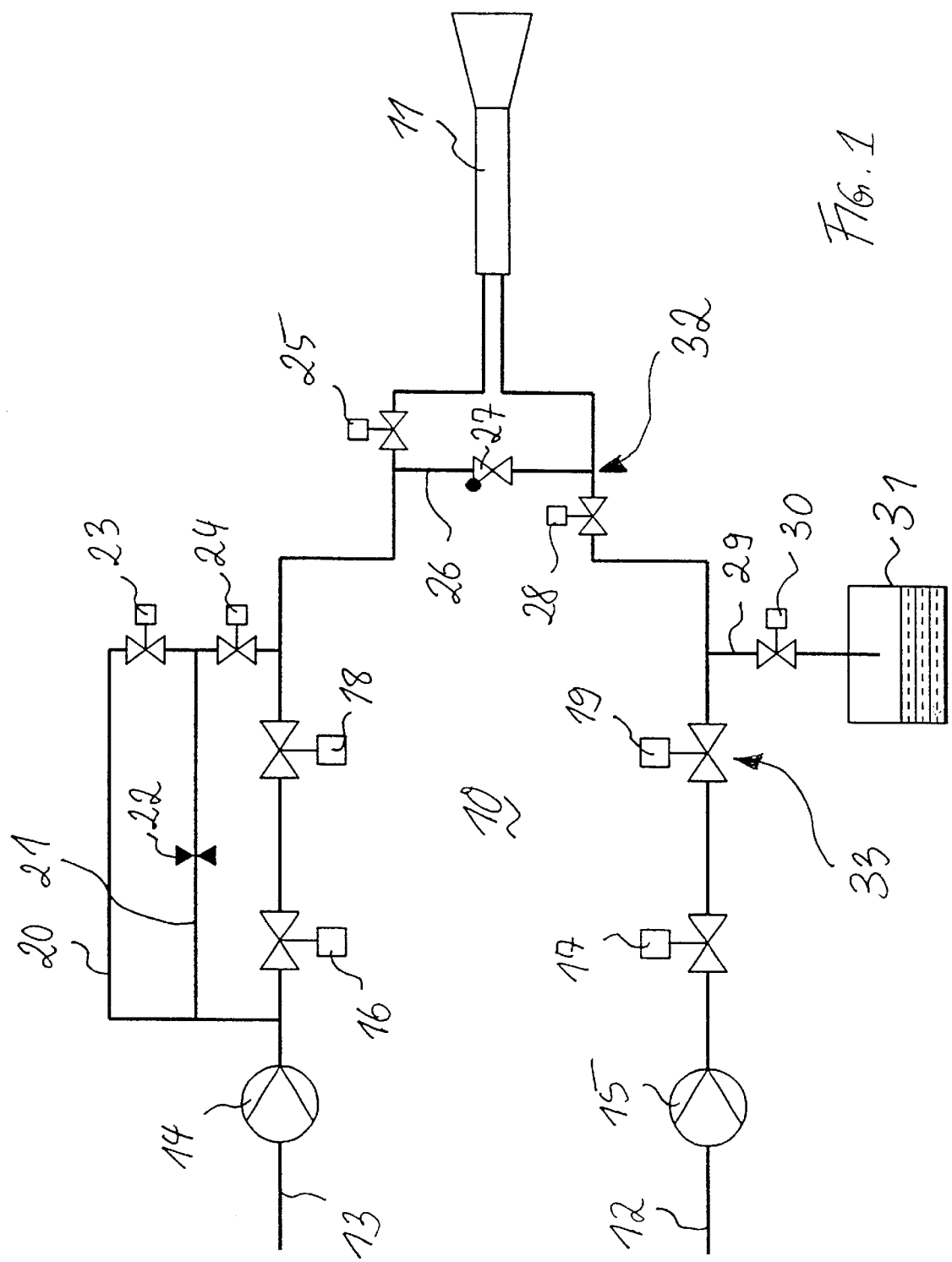
FIG. 1 is a schematic diagram of a preferred embodiment of the device according invention.

Referring now to the drawings, wherein like reference numerals designate identical or corresponding parts throughout the several views, FIG. 1 reproduces the line layout of a preferred exemplary embodiment of the device according to the invention. The fuel system 10 of the burner 11 (with burner lance, nozzles and the like) of a gas turbine comprises two feeder lines 12 and 13. Liquid fuel is fed to the burner 11 via the first feeder line 12. A pump 15 is provided in the first feeder line for this purpose. Arranged in a way known per se downstream of the pump 15 in the first feeder line 12 are a rapid shutdown valve 17 and a control valve 19 for controlling the fuel flow rate. The control valve 19 simultaneously marks in the feeder line 12 an interrupt point 33 at which the flow of fuel is interrupted when the gas turbine is shut down. Downstream of the control valve 19, the feeder line 12 runs via a sector valve 28 (present as an option) to the burner 11 or the burner lance (not illustrated).

As shown in FIG. 1, parallel to the first feeder line 12 is a second feeder line 13, which is likewise fitted with a pump 14 and likewise leads to the burner 11 via a rapid shutdown valve 16, a control valve 18 and a sector valve 25. If required, water can be fed to the burner 11 via the second feeder line 13 in order to reduce the NOx values, and can be injected into the combustion zone. The second feeder line 13 can now advantageously be used to flush the first feeder line 12 or the fuel system 10. Two modifications are provided for this purpose: firstly, shortly upstream of the burner 11 the two feeder lines 12 and 13 are interconnected by a connecting line 26 which can be interrupted by a check valve 27 (or valve). On the other hand, running parallel to the second feeder line 13 are two bypass lines 20, 21 which short-circuit the valves 16 and 18 and can be switched in via flushing valves 23 and 24. The bypass lines 20, 21 are fitted with orifices of which one, the orifice 22 for the bypass line 21, is shown in FIG. 1. Defined flow rates which are respectively required for low-pressure flushing and for high-pressure flushing are provided in the bypass lines by means of the orifice(s) 22. The orifice 22 in the bypass line 21 has a relatively small opening width and produces a low flow rate which is used for the low-pressure flushing operation. By contrast, the opening cross section in the bypass line is larger. The correspondingly higher flow rate is used for the high-pressure flushing operation.

A further modification relates to an additional outlet in the first feeder line 12. This outlet is formed downstream of the interrupt point 33 by a branching drainage line 29 which leads via a drainage valve 30 to a leakage oil tank 31 in which the flushed-out fuel is captured.

Figure 2:
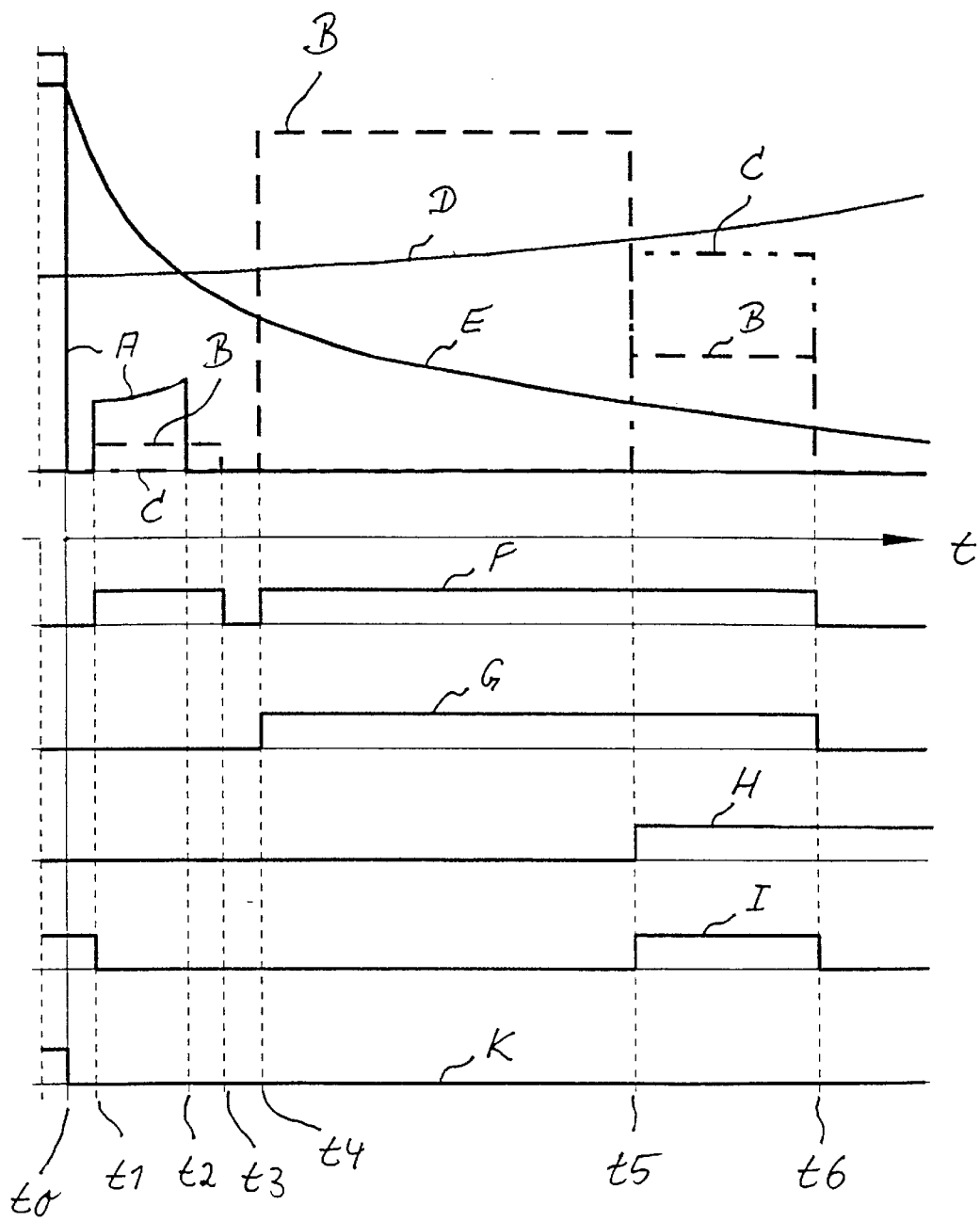
FIG. 2 shows the sequence diagram for a flushing operation using the system according to FIG. 1 in accordance with a preferred embodiment of the method according to the invention.

The sequence of the inventive flushing operation in a device according to FIG. 1 can be explained with the aid of the timing diagrams represented in FIG. 2. The curve A (continuous) in this case shows the fuel/air ratio occurring in the fuel chamber during flushing. The curve B (dashes) shows the flow rate of the auxiliary or flushing medium. The curve C (dots and dashes) shows the flow rate in the drainage line 29. The curve D (continuous) is the extinction limit curve for the fuel/air ratio. The curve E (continuous) shows the rotor speed of the gas turbine. The curves F, G, H, I and K show the operating position (open-closed) of the corresponding valves 24, 23, 30, 28 and 19.

The flushing operation starts at the instant t0 with the shutdown of the gas turbine, whose rotor speed thereupon starts to drop continuously in accordance with curve E. At the same time, closure of the control valve 19 at the interrupt point 33 interrupts the feed of the liquid fuel (curve K). As soon as possible after the gas turbine has been shut down (instant t1), the flushing medium, which is under (low) pressure, is fed into the shut-down fuel system (curve B between instants t1 and t3) by opening the check valve 27 (or valve), arranged as near as possible to the fuel lances (in order to minimize volume) in the connecting line 26. The fuel in the relevant lines is displaced by the flushing medium and escapes into the combustion chamber, where it is either entrained by the combustion chamber air or conveyed back via the drainage systems and into the fuel tank.

During this low-pressure flushing operation, the ratio of fuel to air in the combustion chamber and in the exhaust gas section (curve A) is never allowed to exceed the lean ignition limit, the extinction limit or the stability limit (curve D), in order to exclude the risk of explosions in the exhaust gas section. This stipulation can be met if the fuel mass flow is clearly defined and a clearly defined and known air mass flow is present in the combustion chamber. The last-named requirement is ensured either by virtue of the fact that flushing is carried out as soon as possible after the gas turbine has been shut down during the coastdown phase of the rotor (FIG. 2), or with a start-up device switched on with a defined ventilating speed. The information on the actual amount of air is yielded from the compressor characteristic diagram, the air distribution in the gas turbine and the current speed.

The duration of the low-pressure flushing operation (t1–t2 or t1–t3) is to be selected such that the bulk of the fuel is removed from the fuel nozzles with a very low impulse. Because of the small shear forces associated with the low flow rates, only small residual amounts of fuel can remain behind in the dead water spaces of the lance or as a film on the material surfaces.

After by far the largest portion of the fuel has been removed from the burner lances during the low-pressure flushing (t1–t3), said lances are completely cleaned in a second step, the high-pressure flushing operation. For this purpose, the operating pressure, and thus the flow rate of the flushing medium, is raised (at the instant t4, by opening the flushing valves 24 and 23; curves F and G) until the oil film is completely removed from the nozzle surfaces and all dead water regions are completely freed from oil or fuel (curve B between t4 and t5).

In order reliably to prevent fuel subsequently running out of the feeder lines 12 into lances or nozzles already cleaned, the remainder of the fuel feed system still filled with fuel is emptied rearward into the leakage oil tank 31. For this purpose, directly following the high-pressure flushing operation (instant t5), that is to say with the flushing pressure at its maximum, the drainage valve 30 is opened (curve H) and the drainage line 29 to the leakage oil tank 31 is released. The sector valve 28 must be opened at the same time (curve I). A portion of the flushing medium is used in this case for the purpose of removing this oil from the feeder lines 12 (curve C between t5 and t6). The flushing valves 23 and 24 are closed at the instant t6 (curves F and G), and the flushing operation is terminated.

With specific gas turbines, the parallel injection of water into the lances or burners 11 via the feeder lines 13 can be prevented by closing one or more valves in the water and oil path, the so-called sector valves 25, 28. It is possible in this way for the flow of flushing medium or flushing water to be metered exactly, and to use all the water for flushing the relevant line sections.

As already described further above, when flushing use is preferably made of two bypass lines 20, 21 which can be switched in and have corresponding flow-limiting orifices (22) in order to set the two defined flow rates. However, it is also possible in principle instead of this to use regulating valves or volumetric accumulators at defined pressure levels, or extra pumps with adjustable flow rate. In addition to water (which is preferred), inert gases such as, for example, $N_2$ or $CO_2$ are also suitable as flushing medium.

In summary, the invention yields a method and a system for removing residual fuel which are distinguished by the following advantages:

the system is a very simple one;
no fuel nozzles of complicated design are used;
the method and system are very cost-effective;
the system is highly available;
the fuel systems are in a defined safe state each time the gas turbine is shut down;
there is a high degree of safety with reference to subsequent ignition of fuel;
there is a high degree of reliability with respect to coking of fuel.

Obviously, numerous modifications and variations of the present invention are possible in light of the above teachings. It is therefore to be understood that within the scope of the appended claims, the invention may be practiced otherwise than as specifically described herein.

What is claimed is:

1. A method for removing liquid fuel from the fuel system of a gas turbine having a combustion chamber with at least one burner with fuel nozzles while shutting down the gas turbine, the method comprising:

conducting the liquid fuel through a fuel supply line to the burner nozzles of a gas turbine during operation of the gas turbine;

interrupting the flow of the liquid fuel to the burner through the fuel supply line, wherein the interrupting occurs in the fuel supply line at an interrupt point, spaced from the burner, and wherein an inert medium is fed into the fuel supply line at a feed-in point located between the interrupt point and the burner;

flushing the fuel supply line with the inert medium;

collecting the liquid fuel and the inert medium;

flushing the liquid fuel located in the fuel supply line between the feed-in point and the fuel nozzles into the combustion chamber through the fuel nozzles by means of the inert medium fed in at the feed-in point; and flushing the liquid fuel which is located in the fuel supply line between the feed-in point and the interrupt point, and discharging through a separate outlet by means of the inert medium fed in at the feed-in point.

2. A method for removing liquid fuel from the fuel system of a is turbine having a combustion chamber with at least one burner with fuel nozzles while cutting down the gas turbine, the method comprising:

conducting the liquid fuel through a fuel supply line to the burner nozzles of a gas turbine during operation of the gas turbine;

interrupting the flow of the liquid fuel to the burner through the fuel supply line, wherein the interrupting occurs in the fuel supply line at an interrupt point, spaced from the burner, and wherein an inert medium is fed into the fuel supply line at a feed-in point located between the interrupt point and the burner;

flushing the fuel supply line with the inert medium;

collecting the liquid fuel and the inert medium;

flushing the liquid fuel located in the fuel supply line between the feed-in point and the fuel nozzles into the combustion chamber through the fuel nozzles by means of the inert medium fed in at the feed-in point;

flushing liquid fuel which is located in the fuel supply line between the feed-in point and the interrupt point, and discharging through a separate outlet by means of the inert medium fed in at the feed-in point;

emptying a larger portion of the liquid fuel into the combustion chamber in a first low-pressure flushing operation;

displacing the liquid fuel with the inert medium from relevant lines and only residual amounts of the liquid fuel remaining; and removing remaining residual amounts of the liquid fuel in a second high-pressure pushing operation.

3. A method for removing liquid fuel from the fuel system of a gas turbine having a combustion chamber with at least one burner with fuel nozzles while shutting down the gas turbine, the method comprising:

conducting the liquid fuel through a fuel supply line to the burner nozzles of a gas turbine during operation of the gas turbine;

interrupting the flow of the liquid fuel to the burner through the fuel supply line, wherein the interrupting occurs in the fuel supply line at an interrupt point, spaced from the burner, and wherein an inert medium is fed into the fuel supply line at a feed-in point located between the interrupt point and the burner;

flushing the supply line with the inert medium;

collecting the liquid fuel and the inert medium;

flushing the liquid fuel located in the fuel supply line between the feed-in point and the fuel nozzles into the combustion chamber through the fuel nozzles by means of the inert medium fed in at the feed-in point;

flushing liquid fuel which is located in the fuel supply line between the feed-in point and the interrupt point, and discharging through a separate outlet by means of the inert medium fed in at the feed-in point;

emptying a larger portion of the liquid fuel into the combustion chamber in a first low-pressure flushing operation;

displacing the liquid fuel with the inert medium from relevant lines and only residual amounts of the liquid fuel remaining;

removing remaining residual amounts of the liquid fuel in a second high-pressure flushing operation; and defining a flow rate of the inert medium used in each case for the low-pressure flushing operation and the high-pressure flushing operation.

4. A method for removing liquid fuel from the fuel system of a gas turbine having a combustion chamber with at least one burner with fuel nozzles while shutting down the gas turbine, the method comprising:

conducting the liquid fuel through a fuel supply line to the burner nozzles of a gas turbine during operation of the gas turbine;

interrupting the flow of the liquid fuel to the burner through the fuel supply line, wherein the interrupting occurs in the fuel supply line at an interrupt point, spaced from the burner, and wherein an inert medium is fed into the fuel supply line at a feed-in point located between the interrupt point and the burner;

flushing the fuel supply line with the inert medium;

collecting the liquid fuel and the inert medium;

flushing the liquid fuel located in the fuel supply line between the feed-in point and the fuel nozzles into the combustion chamber through the fuel nozzles by means of the inert medium fed in at the feed-in point;

flushing liquid fuel which is located in the fuel supply line between the feed-in point and the interrupt point, and discharging through a separate outlet by means of the inert medium fed in at the feed-in point;

emptying a larger portion of the liquid fuel into the combustion chamber in a first low-pressure flushing operation;

displacing the liquid fuel with the auxiliary medium from relevant lines and only residual amounts of the liquid fuel remaining;

removing remaining residual amounts of the liquid fuel in a second high-pressure flushing operation;

sending air through the combustion chamber during the low-pressure flushing operation; and holding a fuel to air ratio in the combustion chamber below an extinction limit or a lean ignition limit.

5. A method for removing liquid fuel from the fuel system of a gas turbine having a combustion chamber with at least one burner with fuel nozzles while shutting down the gas turbine, the method comprising:

conducting the liquid fuel through a fuel supply line to the burner nozzles of a gas turbine during operation of the gas turbine;

interrupting the flow of the liquid fuel to the burner through the fuel supply line, wherein the interrupting occurs in the fuel supply line at an interrupt point, spaced from the burner, and wherein an inert medium is fed into the fuel supply line at a feed-in point located between the interrupt point and the burner;

flushing the fuel supply line with the inert medium;

collecting the liquid fuel and the inert medium;

flushing the liquid fuel located in the fuel supply line between the feed-in point and the fuel nozzles into the combustion chamber through the fuel nozzles by means of the inert medium fed in at the feed-in point;

flushing the liquid fuel which is located in the fuel supply line between the feed-in point and the interrupt point, and discharging through a separate outlet by means of the inert medium fed in at the feed-in point;

emptying a larger portion of the liquid fuel into the combustion chamber in a first low-pressure flushing operation;

displacing the liquid fuel with the inert medium from e relevant lines and only residual amounts of the liquid fuel remaining;

removing remaining residual amounts of the liquid fuel in a second high-pressure flushing operation;

sending air through the combustion chamber during the low-pressure flushing operation;

holding a fuel to air ratio in the combustion chamber below an extinction limit or a an ignition limit; and feeding the air into the combustion chamber using a coastdown phase of the gas turbine.

6. The method as claimed in claim 4, including the steps of:

feeding the air into the combustion chamber using a switched-on start-up device.

7. The method as claimed in claim 1, including the steps of:

injecting water using a water injection system which is connected in parallel with the fuel supply line into a combustion zone, and wherein the feeder line of the water injection system is used as the second feeder line.

8. The method as claimed in claim 1, wherein water is used as the inert medium.

9. The method as claimed in claim 1, wherein an inert gas is used as the inert medium.

10. An apparatus for removing liquid fuel from the fuel system of a gas turbine when shutting down the operation of the gas turbine, comprising:

a fuel supply line for conducting fuel from a source to a burner nozzle of a gas turbine;

a fuel flushing line intersecting the fuel supply line for supplying flushing fluid to the fuel supply line, said lines intersecting at a feed-in point;

a water injection system supplying the flushing fluid to the fuel flushing system which is injected into a combustion chamber;

a connecting line connects the fuel flushing line to the feed-in point on the fuel supply line;

a shutting down means located in the connecting line; and wherein arranged on the fuel flushing line are two bypass lines which are optionally switched into the fuel flushing line and in each case contain means for fixing a defined flow rate.

11. The device as claimed in claim 1, wherein the shutdown means comprise a check valve or valve.

12. An apparatus for removing liquid fuel from the fuel system of a gas turbine when shutting down the operation of the gas turbine, comprising:

a fuel supply line for conducting fuel from a source to a burner nozzle of a gas turbine;

a fuel flushing line intersecting the fuel supply line for supplying flushing fluid to the fuel supply line, said lines intersecting at a feed-in point; and wherein a separate outlet is provided on the fuel supply line in front of the feed-in point in the direction of flow.

13. An apparatus for removing liquid fuel from the fuel system of a gas turbine when shutting down the operation of the gas turbine, comprising:

a fuel supply line for conducting fuel from a source to a burner nozzle of a gas turbine;

a fuel flushing line intersecting the fuel supply line for supplying flushing fluid to the fuel supply line, said lines intersecting at a feed-in point;

a separate outlet is provided on the fuel supply line between the feed-in point and an interrupt point the feed-in point in the direction of flow; and wherein the outlet comprises a flushing discharge line with a drainage valve, the flushing discharge line leads to a leakage oil tank.

14. The method as claimed in claim 6, wherein the gas turbine is operated with a switched-on start-up device having a defined ventilating speed in order to feed the air into the combustion chamber.

15. The method as claimed in claim 9, wherein the inert gas is $N_2$ or $CO_2$.

* * * * *